April 24, 1956 M. A. MEYER 2,743,421

MODULATION CIRCUIT

Filed Nov. 2, 1951

*INVENTOR.*
MAURICE A. MEYER

BY Kenway, Jenney, Witter & Hildreth

ATTORNEYS

United States Patent Office 2,743,421

Patented Apr. 24, 1956

2,743,421

MODULATION CIRCUIT

Maurice A. Meyer, Natick, Mass., assignor to Laboratory for Electronics, Inc., Boston, Mass., a corporation of Delaware Application November 2, 1951, Serial No. 254,577

6 Claims. (Cl. 332—41)

Figure 1:
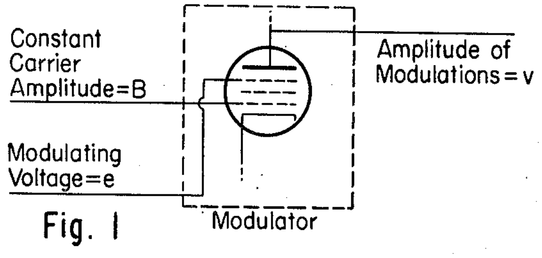

The present invention relates generally to electronic modulation circuits, and more specifically concerns a modulation circuit having a linear characteristic over an extended range of amplitudes of the modulating voltage.

As it is well understood by those familiar with the electronic art, one of the limitations involved in the use of the ordinary modulation circuit results from the non-linearity of the response characteristic with respect to the amplitude of the modulating signal. By careful designing, a modulating tube may be produced which will have a relatively linear characteristic over a definite, limited range of amplitudes. With such a tube, a modulating circuit may be designed so as to be operated largely or exclusively within this range of modulating voltages. Such a circuit, consequently, will produce a modulated output having a linear range, measured in decibels, which is equal, at best, to the linear range of the tube selected as the modulator.

A principal feature of this invention is the provision of a modulation circuit using such tubes of limited linear range, but having a greater linear range than that of any of the component tubes therein.

In general, it may be stated that if a modulator having a linear range of X decibels may be constructed, then this invention shows how two such modulators can be combined to give an output with a linear range of 2X decibels. Similarly, $n$ such modulators can be combined to give an output that is linear over $n$X decibels.

An object of the invention is to provide a modulating circuit having a series of consecutive stages, whereby the resultant response characteristic of the system, as a function of the modulating signal amplitude, is composed of linear segments, each of which corresponds to a range of input modulating voltages within which a particular stage is operating in a linear fashion.

Another object of the invention is to provide such a multi-stage modulator adapted for making novel use of the gain saturation obtained at a certain voltage level in some amplifier tubes having gain-changing electrodes. The purpose of this is to render the stage operative as a class A amplifier, except when the modulating signal is within the range of values for which the particular stage reacts linearly, that is, as a modulator. As hereinafter noted, however, the invention may also be practiced without depending upon gain saturation, if so desired.

A further object of the invention is to provide a modulating circuit having a series of consecutive stages wherein there is for every amplitude of the externally applied modulating voltage a particular stage which responds linearly to its own modulating signal while the remaining stages remain passive, thus causing the over-all response of the system as measured at the output of the last stage, to respond linearly to the externally-applied modulating voltage.

A still further object of the invention is to provide a modulation circuit having a characteristic the linearity of which is limited only by the number of stages therein, each stage of which includes a modulating tube having a linear response over a certain range of modulating voltage amplitudes, whether or not such linear range is achieved through the use of feed back circuits.

Other features and objects of the invention will become apparent from the description, including the related drawings, and from the claims.

Figure 2:
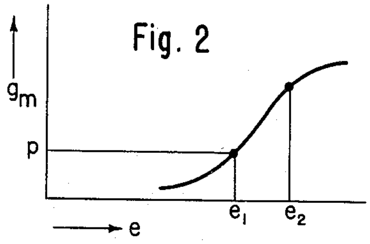
Figure 3:
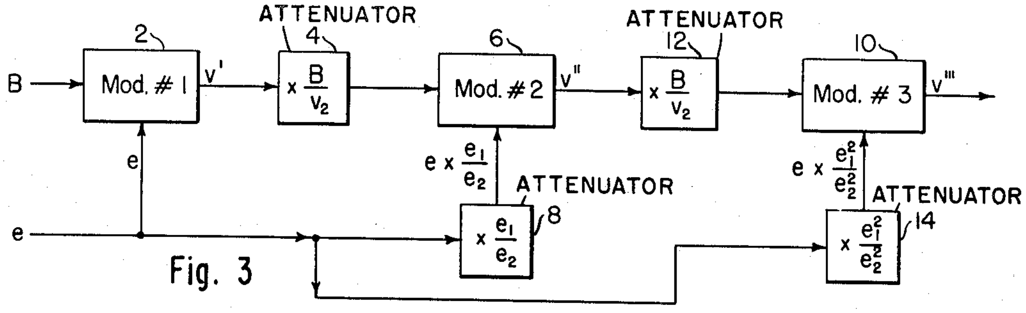
Figure 4:
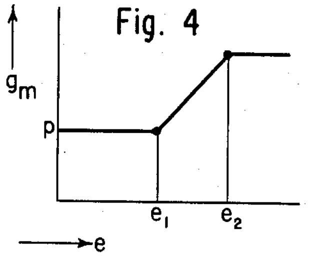
Figure 5:
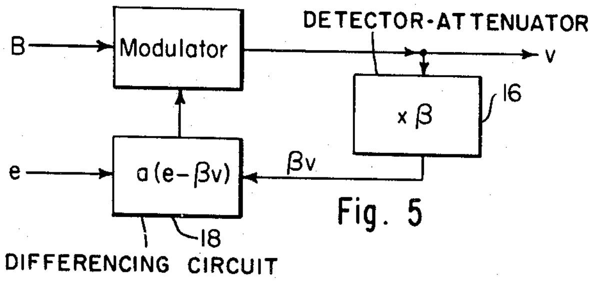
Figure 6:
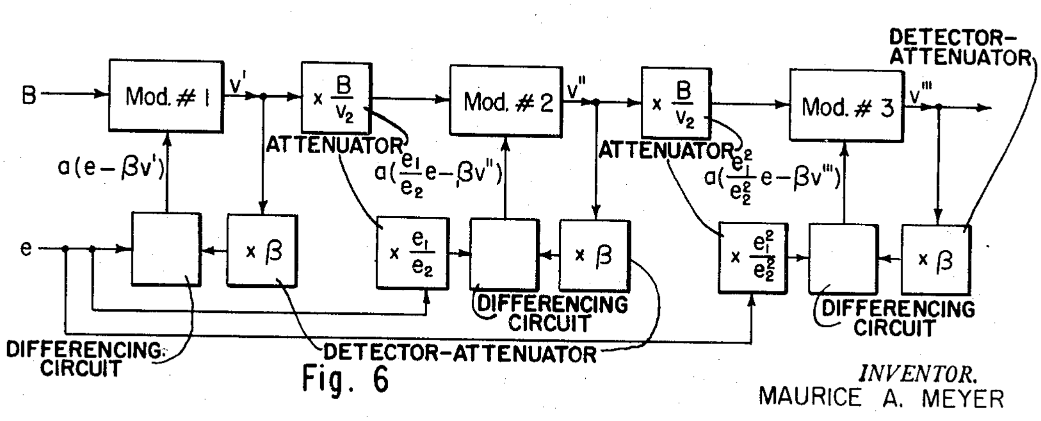

In the drawings, Fig. 1 is a diagrammatic representation of a single-stage modulation circuit, Fig. 2 is a curve showing the relationship of transconductance to suppressor-grid voltage for a typical codulating tube; Fig. 3 is a diagrammatic representation of a three-stage linear modulator according to this invention; Fig. 4 is a curve showing the relationship of trans-conductance to suppressor grid voltage for a typical modulating tube where clamper circuits are employed; Fig. 5 is a diagrammatic representation of a single-stage modulation circuit employing feedback; and Fig. 6 shows a three-stage linear modulator employing feedback loops in each stage.

Referring first to Fig. 1, I show in diagrammatic form a single-stage modulation circuit which may be considered as the basic element of construction according to this invention. It may be assumed that the carrier and modulating signals are applied to the modulator in any conventional manner, but for purposes of illustration it is assumed that the carrier is applied to the control grid and the modulating voltage to the suppressor grid of a pentode. The tube, in turn, is assumed to be so designed that its gain, or $g_m$, is responsive to changes in the suppressor grid voltage.

It will be apparent to those familiar with this art that many modulator tubes of the above type have a characteristic of the general shape shown in Fig. 2. That is, over a certain range $e_1$–$e_2$ the gain varies approximately linearly with the modulating voltage. Above this range, further increases in suppressor grid voltage produce little or no change in the gain, and the gain is therefore said to be saturated. Below this range the gain is also relatively unresponsive to changes in suppressor grid voltage.

By reason of the definition of transconductance we may write the following expression for the alternating component $V_0$ of the output voltage for the modulator:

$$V_0 = k_1 g_m e_g$$

where $k_1$ is a proportionality constant and $e_g$ is the control grid voltage which is varied by the carrier signal, as explained above. The carried signal is normally of high frequency relative to the modulating signal. Assuming the carrier to be of constant amplitude B, we may therefore write the following expression for the envelope $v$ of the modulations at the output:

$$v = k_1 B g_m$$

In the linear range $e_1$–$e_2$, we may write $dg_m = k_2 de$, and therefore, in this range, $$dv = k_1 k_2 B de = k_3 de \quad (1)$$

Therefore, as $e$ varies from $e_1$ to $e_2$, the modulations vary linearly from a value $v_1$ to a value $v_2$. For values of modulating voltage above $e_2$ the modulations remain substantially at the value $v_2$, because of saturation.

Turning now, to Fig. 3, suppose that three modulators of the type described above are connected as shown. A modulator 2, called the first modulator, is connected as in Fig. 1. The output of this modulator is fed through a network 4 having the function of scaling down the amplitude of the modulations by the factor $$\frac{B}{v_2}$$

A second modulator 6, instead of receiving a carrier of constant amplitude B, receives the output of the network 4. The modulating signal to the second modulator is similarly scaled down by a network 8, the scale factor being $$\frac{e_1}{e_2}$$

A third modulator 10 and its scale networks 12 and 14 repeat the pattern of connections heretofore described, with the scale factors indicated in Fig. 3.

The operation of the tandem arrangement of modulators as shown in Fig. 3 may now be described.

First, consider the behavior of the system as $e$ changes through the range zero to $e_1$. In this range, the first modulator experiences a gain change ultimately leading to the value $gm=p$, as shown in Fig. 2. The output modulation envelope $v'$ follows the curve of Fig. 2. Because of the scaling-down of the modulating signals to the second and third modulators, and also because of the sluggish response of gain to modulating voltage for values of the latter appreciably below $e_1$, the gain of both the second and third stages remains substantially constant. Therefore, over the given range of $e$, the second and third stages act substantially as class A amplifiers, passing along the signal $v'$ until it reaches the output. However, because of the scale-down of $v'$ by the network 4, the carrier input to the second modulator varies only from zero up to $e_1,p$).

$$\frac{B}{v_2}\cdot v_1$$

The output of the second modulator is again scaled down by the network 12, so that the total output of the system varies non-linearly through a range much less than the range zero to $v_1$ of the first stage, and the variations, rather than being linear, follow the curve of Fig. 2 from zero up to $(e_1,p)$.

Consider next the behavior of the system as $e$ changes through the range $e_1$ to $e_2$. As previously indicated, this is the range of $e$ over which the first modulator experiences a linear change in gain, and hence, as shown by Formula 1 above, there is a linear change in the amplitude of the modulation envelope $v'$.

The output $v'$ varies from $v_1$ to $v_2$, and the input carrier to the second modulator varies from $$\frac{B}{v_2}\cdot v_1 \text{ to } B$$

The modulating signal to the second modulator varies from $$\frac{e_1^2}{e_2} \text{ to } e_1$$

Thus, as shown by Fig. 2, the second modulator operates in the non-linear range below $e_1$ for this range of the input signal $e$.

The output $v''$ of the second modulator, which is a function of both a changing gain and a changing amplitude of input carrier, reflects substantially the linear shape of its input carrier. This output, scaled down by the network 12, therefore produces a linear carrier input to the control grid of the third modulator, which operates substantially as a class A amplifier by reason of the low value of its modulating voltage. The overall output of the system is therefore linear over the range $e_1$ to $e_2$ of the modulating voltage.

In a similar manner the behavior of the system as $e$ changes over the range $$e_2 \text{ to } \frac{e_2^2}{e_1}$$

may be analyzed. Here, the voltage $e$ is at all times in excess of $e_2$, and hence, the first modulator is continuously saturated. This means that the amplitude $v'$ of the output modulation envelope remains at a constant value approximately equal to $v_2$ over this whole range of $e$, and also that, by reason of the effect of the network 4, the input carrier to the second modulator appears as an unmodulated carrier of constant amplitude B over the whole range. Because of the scale factor of the network 8, as $e$ varies over this range the modulation signal to the second modulator varies from $$\frac{e_1}{e_2}\cdot e_2=e_1 \text{ to } \frac{e_1}{e_2}\cdot\frac{e_2^2}{e_1}=e_2$$

and therefore the second modulator is linear over the whole range.

The output $v''$ varies from $v_1$ to $v_2$, and the scaled-down input carrier to the third modulator varies from $$\frac{B}{v_2}\cdot v_1 \text{ to } B$$

The modulating signal to the third modulator varies between $$\frac{e_1^2}{e_2^2}\cdot e_2=\frac{e_1^2}{e_2} \text{ and } \frac{e_1^2}{e_2^2}\cdot\frac{e_2^2}{e_1}=e_1$$

It will be noted that these input conditions correspond to those for the second stage for the preceding range of $e$. As in that case, the output of the third stage reflects substantially the linear shape of its input carrier.

In an exactly similar manner, the behavior of the system as $e$ changes over the range $$\frac{e_2^2}{e_1} \text{ to } \frac{e_2^3}{e_1^2}$$

can be analyzed. Over this range the third modulator is linear and the first and second modulators, both being saturated, act merely as class A amplifiers.

From the foregoing discussion, it can now be seen that for a range of $e$ extending from $$e_1 \text{ to } \frac{e_2^3}{e_1^2}$$

the output modulations of the final stage vary linearly from a small value well below $v_1$ to a maximum value of $v_2$. In place of a linear range, in decibels, of $$20\log_{10}\frac{e_2}{e_1}$$

which is the characteristic of a single-stage modulator, there is produced a linear range of $$60\log_{10}\frac{e_2}{e_1}$$

that is, the range is trebled, since three stages were used in the given example. Obviously, if $n$ stages are used the range of a single stage may be extended $n$ times.

It will also be noted that the faithful adherence of the modulator to the desired linear characteristic depends upon the flatness of the curve shown in Fig. 2 both above and below the linear range $e_1$–$e_2$. That is, except for this range of modulation signals, the tubes preferably act merely as class A amplifiers, passively transferring the wave from the preceding stage to the succeeding stage without distortion. To aid in improving the operation in the non-linear range it is possible to employ a number of well-known clamper circuits, the effect of which would be to produce a characteristic such as that shown in Fig. 4. The theory and use of clamper circuits is so well understood in the art that a further description of their adaptation to this invention is not included in this specification. It may be added that I have constructed linear modulators according to this invention which operate very satisfactorily without the aid of any clamper circuits whatsoever.

As already suggested, a number of modulator tubes in common use have characteristics the linearity of which may be improved or extended by the use of feedback loops. Feedback modulators of this type are readily adaptable for use in the stages of a linear modulator according to this invention. This may be demonstrated by reference to Fig. 5. This figure differs from Fig. 1 only in the addition of a feedback network including an attenuator and detector 16 having the effect of multiplying the output modulation envelope $v$ by the factor $\beta$, and a network 18 which measures the difference between the modulating input voltage $e$ and the attenuated output $\beta v$, and amplifies this difference by the factor "$a$." In one form, the network 18 may comprise simply a conventional twin triode or twin pentode differential amplifier, the two inputs thereto being the modulating input voltage $e$ and the voltage $\beta v$. Of course, other differencing circuits are available and may be employed.

Following a procedure analogous to that used in connection with Fig. 1 we may write the following expression for the alternating component $V_0$ of the output voltage for the modulator in Fig. 5:

$$V = k_1 g_m e$$

as in the case of Fig. 1.

We may also write the following expression for the envelope $v$ of the modulations at the output:

$$v = k_1 B g m$$

In the linear range $e_1$–$e_2$, we may write $$dg_m = k_2 d[a(e - \beta v)]$$

and therefore, in this range, $$(2) \qquad dv = k_1 k_2 B d[a(e - \beta v)] = k_4 de$$

Therefore, as $e$ varies over the linear range the modulation envelope varies linearly.

The extent of this linear range of the feedback modulator, however, is greater than that of the same tube without the feedback loop. This may be seen from the following considerations. In the range for which the tube responds linearly without feedback, the detected voltage $\beta v$ tends to cancel a part of the input $e$. However, as shown above, this does not destroy the linear characteristic of the output response in this region. Toward the upper end of the linear range, where $v$ tends to increase less rapidly than $e$, the difference $(e - \beta v)$ begins to increase more and more rapidly, with the result that the gain and the value of $v$ reach higher values, i. e., values which tend to draw the response characteristic of the stage closer to the line through its linear region. It will be apparent to those familiar with this art that the limitations on the use of feedback loops to linearize gain response characteristics in this manner include a number of factors such as the size of the factor $\beta$, the inherent linearity of the modulator without feedback, the valve of $v$ at the saturation level, and the minimum level of carrier output that can be achieved with no modulation present.

Fig. 6 shows an arrangement of three feedback modulator stages according to the invention. From this drawing an additional advantage of using a feedback loop may be illustrated. Consider, for example the response for the range of $e$ between $e_1$ and $e_2$. Over this range, as for the embodiment of Fig. 3, the first modulator responds linearly. As a consequence, the carrier input to the second modulator also varies linearly, as does its modulating voltage input $$\frac{e_1}{e_2} \cdot e$$

It is evident that a value of $\beta$ may be selected such that, when $v'$ reaches the value $v_1$ corresponding to the beginning of the linear range for the first modulator, the feedback voltage $\beta v''$ in the second stage exactly equals the corresponding value of $$\frac{e_1}{e_2} \cdot e$$

so that the input to the gain-changing electrode of the second stage will be zero. It is also evident that as the output of the first stage progresses through the range from $v_1$ to $v_2$, the feedback voltage will at all times exactly equal the voltage $$\frac{e_1}{e_2} \cdot e$$

Therefore, continuously throughout this range of $e$, the second stage acts as a class A amplifier and transmits undistorted the linear wave form of the output $v'$ of the first stage.

Having thus described my invention, I claim:

1. Apparatus for modulating first and second electrical signals comprising, a plurality of cascaded modulating circuits each having first and second inputs and a single modulated signal output, means for applying said first and second electrical signals respectively to the first and second inputs of the first of said modulating circuits, means for applying said second electrical signal to the successive second inputs of said cascaded modulating circuits in amounts successively attenuated as a function of the relative linear range of modulation performance of each of said modulating circuits, and attenuating means serially coupling the single output of each modulating stage to the first input of the successive modulating stage, the output signal of said apparatus being derived at the single output of the last of said cascaded modulating stages.

2. Modulation apparatus for substantially linearly mixing a carrier of substantially constant amplitude with a modulating signal of variable amplitude $e$ comprising, a plurality of cascaded modulator electron tubes each including a control electrode and a gain changing electrode and each exhibiting the characteristic of a linear variation in gain as a function of potential applied to said gain changing electrode from a lower potential value $e_1$ to an upper potential value $e_2$ and further exhibiting the characteristic of substantially constant gain for potentials less than $e_1$ and greater than $e_2$ as applied to said gain changing electrode, means for applying said carrier to the control electrode and said modulating signal at amplitude $e$ to the gain changing electrode of the first of said modulator electron tubes, means for attenuating said modulating signal by factors $$\frac{e_1}{e_2}, \frac{e_1^2}{e_2^2} \ldots$$

for application to the gain changing electrodes of said second, third and successive modulator electron tubes respectively, and means for fractionally coupling the modulated signal output of each of said electron tubes respectively to the control electrode of the next successive electron tube, the output of said apparatus being derived as the output of the last of said cascaded electron tubes.

3. Modulation apparatus for substantially linearly mixing a carrier of substantially constant amplitude with a modulating signal of variable amplitude $e$ comprising, a plurality of cascaded modulator electron tubes each including a control electrode and a gain changing electrode and each exhibiting the characteristic of a linear variation in gain as a function of potential applied to said gain changing electrode from a lower potential value $e_1$ to an upper potential value $e_2$ and further exhibiting the characteristic of substantially constant gain for potentials less than $e_1$ and greater than $e_2$ as applied to said gain changing electrode, means for applying said carrier to the control electrode and said modulating signal at amplitude $e$ to the gain changing electrode of the first of said modulator electron tubes, means for attenuating said modulating signal by factors $$\frac{e_1}{e_2}, \frac{e_1^2}{e_2^2} \ldots$$

for application to the gain changing electrodes of said second, third and successive modulator electron tubes respectively, and attenuating means coupling the modulated signal output of each of said electron tubes respectively to the control electrode of the next successive electron tube, said attenuating means being arranged to attenuate the signal applied thereto by a factor equal to said substantially constant carrier amplitude divided by the amplitude of modulation output of each of said electron tubes when a modulating signal of amplitude $e_2$ is applied to its gain changing electrode, the output of said apparatus being derived as the output of the last of said cascaded electron tubes.

4. In a modulator for mixing a carrier signal of substantially constant relative amplitude with a modulating signal of variable relative amplitude $e$, a plurality of cascaded electron tubes each having at least a control electrode, a gain changing electrode and an output circuit, said electron tubes each exhibiting the characteristic of gain variation as a linear function of gain changing electrode potential between lower and upper potential values $e_1$ and $e_2$ respectively and further exhibiting gain saturation for gain changing electrode potentials in excess of said potential $e_2$, attenuator means coupling said output circuit of each of said modulator electron tubes to said control electrode of the next successive modulator electron tube and being effective to reduce the signal so coupled by a factor inversely related to the degree of modulation obtained when modulating signal amplitude $e$ substantially equals said potential $e_2$, means for applying said carrier signal to the control electrode and said modulating signal to the gain changing electrode respectively of said first modulator electron tube, and means for attenuating said modulating signal by constant factors $$\frac{e_1}{e_2}, \frac{e_1^2}{e_2^2} \ldots$$

for application to the gain changing electrode of said second, third and successive modulator electron tubes, respectively.

5. Apparatus for mixing a carrier signal with a modulating signal comprising, in combination, a plurality of cascaded modulators each including a modulator tube having first and second inputs, a differencing network and an output circuit, said differencing network being arranged for continuous comparison of a fractional amount of the signal appearing in said output circuit and a modulating signal, the output of said differencing network being applied to said modulator tube second input, means for applying said carrier signal to the first input and said modulating signal to the second input respectively of the first of said cascaded modulators, means fractionally coupling said output circuit of each of said modulators to the first input of the next successive of said cascaded modulators, and networks having successively increasing attenuation factors energized by said modulating signal and coupled to said differencing networks for applying progressively smaller fractions of said modulating signal to said differencing networks of successive modulators, the output of said apparatus being taken directly from the output circuit of the last of said cascaded modulators.

6. Modulation apparatus comprising, a plurality of modulator tubes each exhibiting the characteristic of gain saturation and serially interconnected by networks providing signal attenuation factors related to the modulation characteristic of each modulator tube in the gain saturation region, means for applying a carrier signal to the first of said serially connected modulator tubes, means for applying a modulating signal in parallel to each of said modulator tubes through circuits of progressively increasing attenuation factor, and means for taking an apparatus output signal from the last of said serially connected modulator tubes.

References Cited in the file of this patent

UNITED STATES PATENTS

| | | |
|---|---|---|
| 2,267,703 | Henkler | Dec. 23, 1941 |
| 2,379,042 | Shaw | June 26, 1945 |
| 2,463,275 | Henderson | Mar. 1, 1949 |
| 2,590,784 | Moulton | Mar. 25, 1952 |

FOREIGN PATENTS

| | | |
|---|---|---|
| 420,019 | Great Britain | Nov. 23, 1934 |